(12) United States Patent
Strobel et al.

(10) Patent No.: US 7,441,485 B2
(45) Date of Patent: Oct. 28, 2008

(54) APPARATUS FOR DISMANTLING A RADIOACTIVELY CONTAMINATED INSTALLATION PART AND METHOD FOR DISMANTLING THE INSTALLATION PART

(75) Inventors: Reinhardt Strobel, Nürnberg (DE); Bruno Dippel, Poxdorf (DE); Josef Forster, Hirschaid (DE)

(73) Assignee: Areva NP GmbH, Erlangen (DE)

( * ) Notice: Subject to any disclaimer, the term of this patent is extended or adjusted under 35 U.S.C. 154(b) by 67 days.

(21) Appl. No.: 11/298,067

(22) Filed: Dec. 9, 2005

(65) Prior Publication Data
US 2006/0215802 A1 Sep. 28, 2006

(30) Foreign Application Priority Data
Dec. 9, 2004 (DE) ........................ 10 2004 059 586

(51) Int. Cl.
*B23B 5/14* (2006.01)
*B23B 5/16* (2006.01)

(52) U.S. Cl. ................................. 82/83; 82/82; 82/70.2

(58) Field of Classification Search ...................... 82/83, 82/82, 84, 70, 70.2
See application file for complete search history.

(56) References Cited

U.S. PATENT DOCUMENTS

| | | | | |
|---|---|---|---|---|
| 3,293,963 A | * | 12/1966 | Carroll et al. | 83/54 |
| 3,733,939 A | * | 5/1973 | Paysinger et al. | 82/113 |
| 3,859,877 A | * | 1/1975 | Sherer et al. | 82/82 |
| 4,822,221 A | * | 4/1989 | Illakowicz | 409/309 |
| 5,263,062 A | | 11/1993 | Guigon et al. | |
| 5,974,924 A | | 11/1999 | Schartinger et al. | |

* cited by examiner

*Primary Examiner*—Willmon Fridie
(74) *Attorney, Agent, or Firm*—Laurence A. Greenberg; Werner H. Stemer; Ralph E. Locher

(57) ABSTRACT

An apparatus for dismantling a radioactively contaminated tubular installation part which is located under water contains a base part which can be fixed to the installation part and in which a rolling cutting apparatus is mounted. The rolling cutting apparatus can be positioned in or on the installation part and has at least one cutting roller which can be moved to the inner or outer surface of the installation part and can be moved along it. The apparatus can be used to dismantle and remove even installation parts to which access is difficult, for example the cyclones which are installed in the water/steam separator of a boiling water reactor.

6 Claims, 6 Drawing Sheets

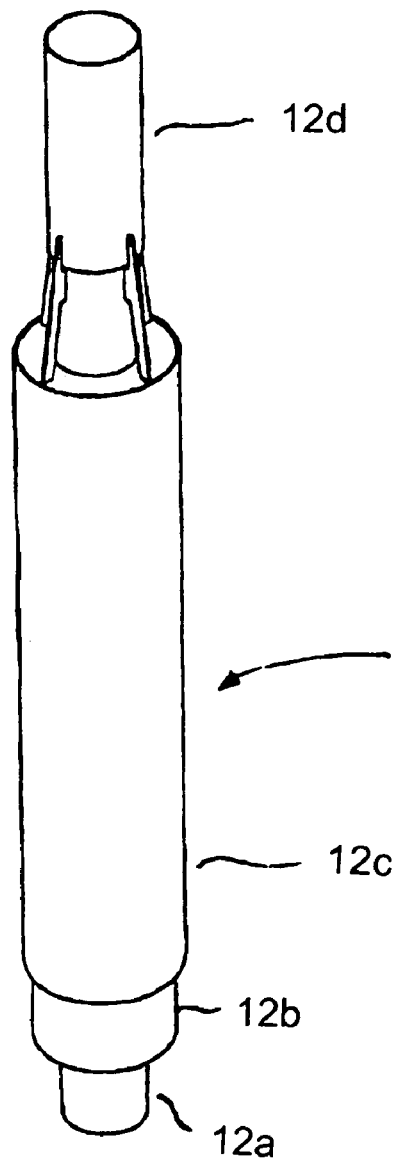
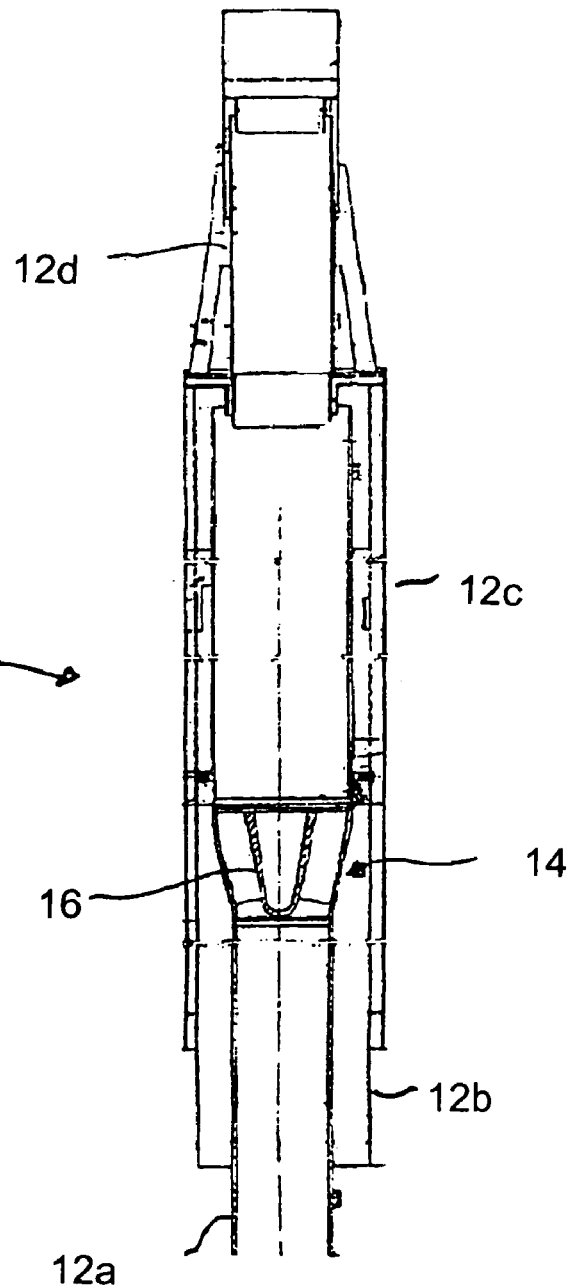
FIG. 7
FIG. 8

APPARATUS FOR DISMANTLING A RADIOACTIVELY CONTAMINATED INSTALLATION PART AND METHOD FOR DISMANTLING THE INSTALLATION PART

BACKGROUND OF THE INVENTION

Field of the Invention

The invention relates to an apparatus for dismantling a radioactively contaminated installation part. The invention also relates to a method, which is carried out using an apparatus such as this, for dismantling a water separator in a boiling water reactor.

Particularly during the demolition of a nuclear power station that has been shut down, there are a large number of radioactively contaminated installation parts which must be dismantled into transportable components before they can be disposed of. In order to prevent the personnel carrying out the dismantling process from being radioactively contaminated, a dismantling process such as this must be carried out by remote control, under water. Furthermore, the dismantling process should be carried out using appliances and methods in which as little secondary waste, for example swarf or dust, as possible is produced which, in addition to contamination of the water, can also lead to a visual impediment, which impedes the ability to carry out the dismantling process correctly. Furthermore, installation parts such as these are often physically complicated structures with components to which access is difficult and which require the use of special dismantling apparatuses.

One such complex installation part, by way of example, is the water/steam separator (referred to for short as the water separator in the following text) of a boiling water reactor. A water separator such as this is used for separation of the water/steam mixture that is created in the reactor pressure vessel of a boiling water reactor, and is illustrated in FIG. 6. The water separator 2 contains a large number of tubular cyclones 4, in which steam and water are separated. The cyclones 4 are disposed in a mounting rack 6, and are welded in the mounting rack 6 by of holding struts 10, which are fixed to mounting rings 8.

FIGS. 7 and 8 show enlarged illustrations of a cyclone 4 such as this. This is a tubular installation part which is composed of a plurality of tubes 12a-d, which are disposed coaxially with respect to one another and partially one inside the other. The inner tube 12a also has internal fittings in the form of a swirl body 16 in a conical tube section 14. When disposing of the water separator, the cyclones 4 must be dismantled within the water separator, that is to say in spatially confined conditions, in order to remove them.

SUMMARY OF THE INVENTION

It is accordingly an object of the invention to provide an apparatus for dismantling a radioactively contaminated installation part and a method for dismantling the installation part which overcome the above-mentioned disadvantages of the prior art devices and methods of this general type, with which it is possible to dismantle a tubular installation part, to which access is difficult and which is under water, into pieces.

With the foregoing and other objects in view there is provided, in accordance with the invention, an apparatus for dismantling a radioactively contaminated tubular installation part disposed under water. The apparatus contains a base part for fixing to the installation part; and a rolling cutting apparatus mounted in the base part. The rolling cutting apparatus is positioned in or on the installation part and has at least one cutting roller being moved to an inner or outer surface of the installation part and being moved along the installation part.

The apparatus for dismantling the radioactively contaminated tubular installation part, which is under water, contains the base part which can be fixed to the installation part and in which the rolling cutting apparatus is mounted. The rolling cutting apparatus can be positioned in or on the installation part and has at least one cutting roller which can be moved to the inner or outer surface of the installation part and can be moved along it. The use of an apparatus which can be fixed to the installation part allows the installation part to be dismantled while it is still in the installed state within a component whose position is fixed during the dismantling process, for example within a reactor pressure vessel which is installed in a fixed position in a nuclear power station or within a part of a component such as this, which has been placed on the bottom of a flooded pond in the nuclear power station and has been removed from its installed position in advance. The use of a rolling cutting apparatus also prevents secondary waste from being created in the form of swarf or grinding dust, so that on the one hand this prevents contamination of the water, and on the other hand prevents visual impediment when checking the work carried out.

An apparatus according to the invention is particularly suitable for dismantling the water separator, which contains a large number of cyclones, in a boiling water reactor, in which the cyclones are each separated into a plurality of tubular pieces, are removed from the water separator in pieces, and are stored in storage containers that are provided.

Other features which are considered as characteristic for the invention are set forth in the appended claims.

Although the invention is illustrated and described herein as embodied in an apparatus for dismantling a radioactively contaminated installation part and a method for dismantling the installation part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 7 is a diagrammatic, perspective view of a cyclone of the water separator; and FIG. 8 is a diagrammatic, longitudinal sectional view through the cyclone.

DESCRIPTION OF THE PREFERRED EMBODIMENT

Figures 1, 2:
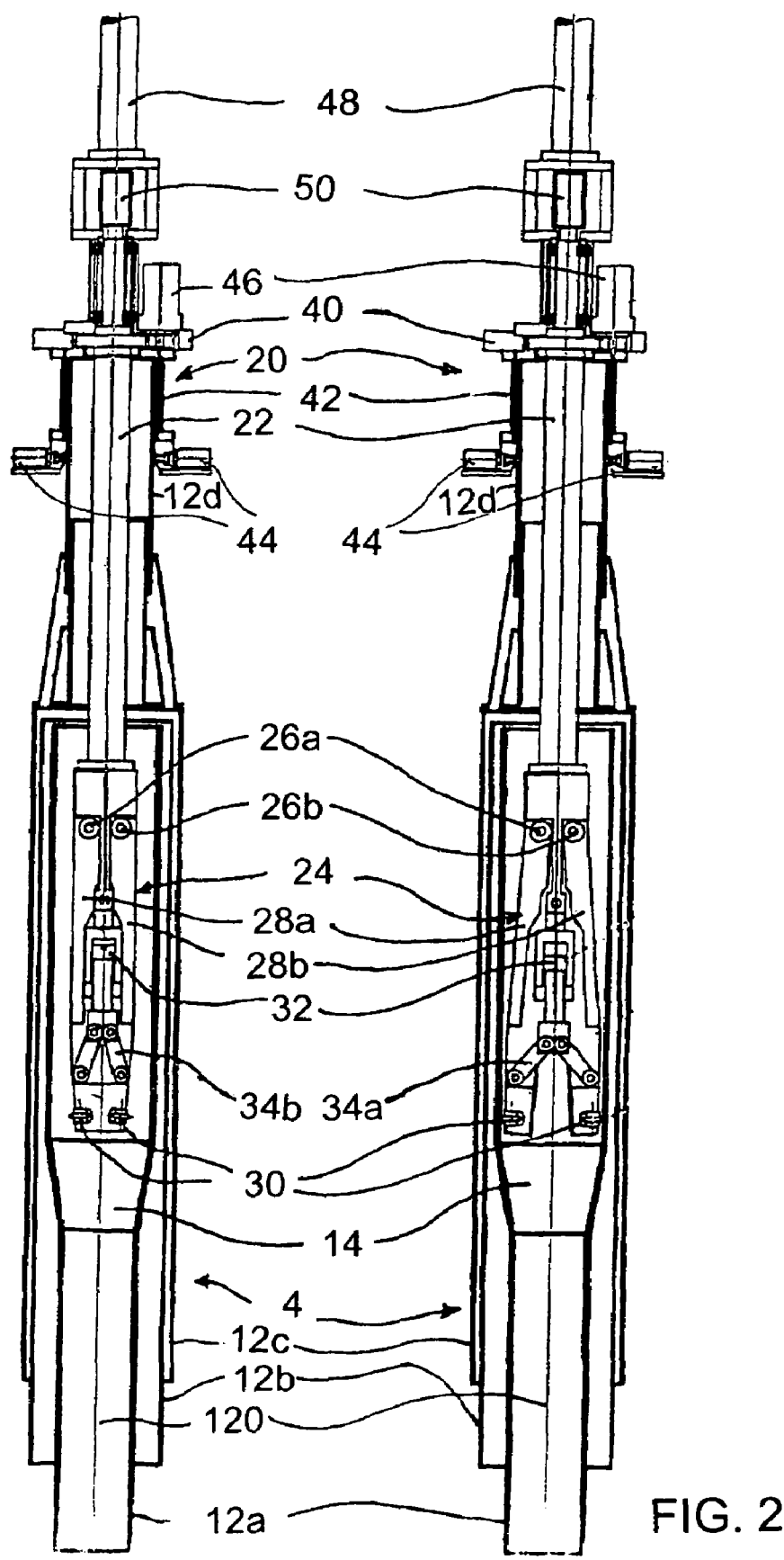
FIGS. 1 and 2 are diagrammatic, partially cutaway illustrations of an apparatus which has been inserted into an interior of a cyclone, in an initial or working position, according to the invention.

Referring now to the figures of the drawing in detail and first, particularly, to FIG. 1 thereof, there is shown an apparatus according to the invention which is fitted to or in a cyclone 4 in an initial position. The apparatus contains a base part 20 in which a shaft 22 is mounted such that it can rotate, at whose free end a rolling cutting apparatus 24 is disposed. In the installed state, the cyclone 4 is located in the water separator and is surrounded by adjacent cyclones, which are not illustrated in FIG. 1 for clarity reasons. The rolling cutting apparatus 24 has two lever arms 28a and 28b, which are mounted so that they can pivot about a respective pivoting axis 26a, 26b, which runs at right angles to the shaft axis, and at the free end of each of which lever arms 28a, 28b a cutting roller 30 is mounted, whose roll axis, once the lever arms 28a, 28b have been pivoted out sideways, that is to say after the cutting rollers 30 have been moved to the inner circumference of the tube 12a, runs parallel to its center axis 120.

In order to pivot the lever arms 28a, 28b, the rolling cutting apparatus 24 contains a hydraulic actuating apparatus with a hydraulic cylinder 32 which acts axially, that is to say in the direction of the axis of the shaft 22, and whose piston acts via transmission levers 34a, 34b on the lever arms 28a, 28b, pivoting them outward or inward.

A bearing plate 40 of the base part 20 is seated on the upper tube 12d of the cyclone 4. A sleeve 42, which extends in the axial direction, is fixed to the bearing plate 40, is pushed over the tube 12d and is fitted at its free end with a plurality of radially acting clamping cylinders 44, whose pistons are moved radially against the tube 12d and fix the apparatus with a force fit on the cyclone 4. In other words, the base part 20 is fixed with a force fit to the installation part, in the example of the cyclone 4, such that the base part 20 is supported by the installation part.

A rotating drive 46, which drives the shaft 22, is disposed on the bearing plate 40. The base part 20 is fixed at the end of a handling linkage 48, by which the apparatus is positioned on or in the cyclone 4.

A rotating bushing 50 is disposed at the opposite end of the shaft 22 to the rolling cutting apparatus 24, and is used to supply hydraulic fluid to the hydraulic cylinder 32.

When the cutting rollers 30 are positioned on the internal circumference of the tube 12a, that is to say in the working position illustrated in FIG. 2, rotation of the shaft 22 now results in the tube 12a being cut through above the conical tube section 14 which contains the swirl body of the cyclone 4.

Figure 6:
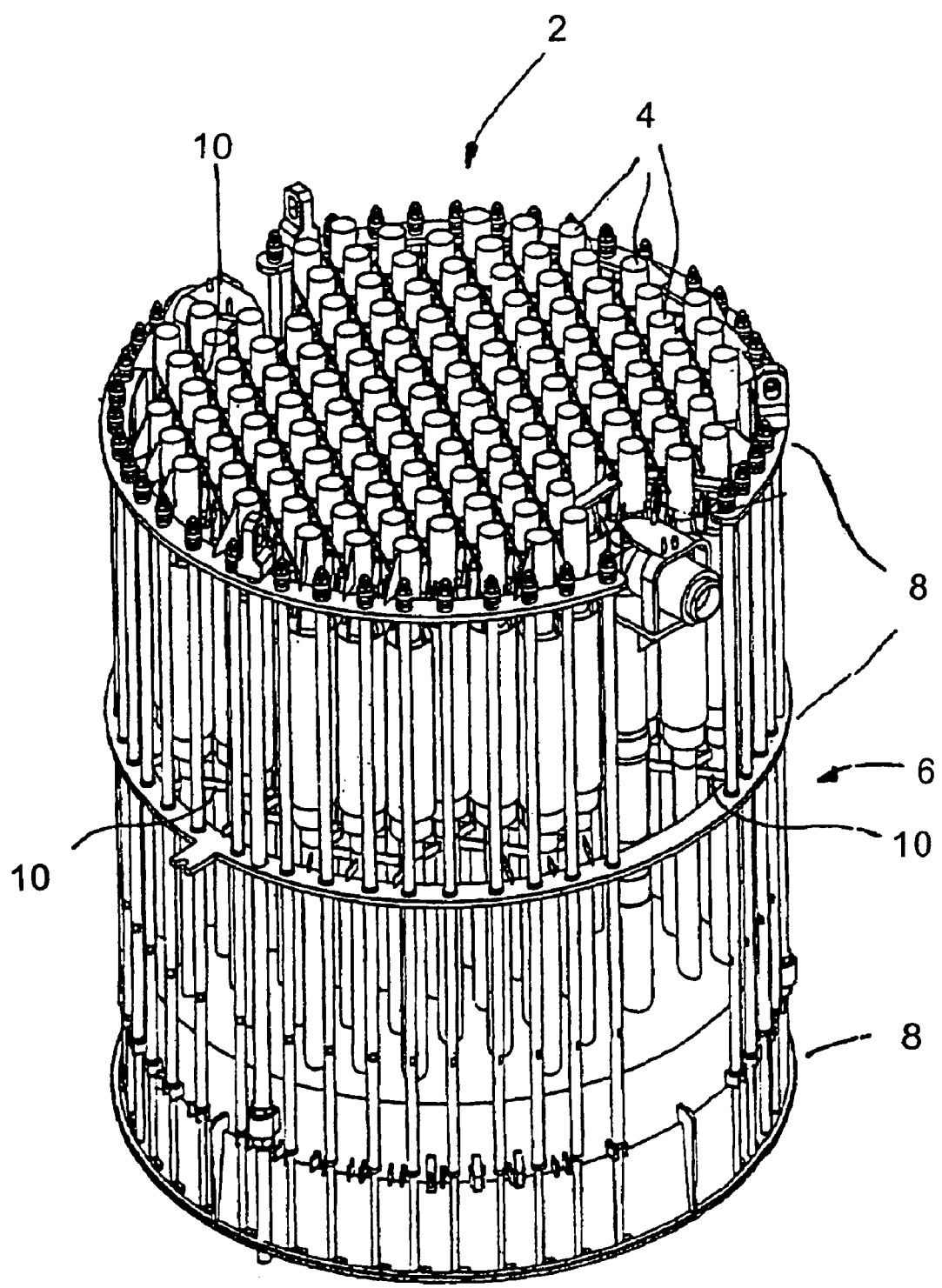
FIG. 6 is a diagrammatic, perspective view of a water separator in a boiling water reactor.

Once the inner tube 12a has been cut through above the tube section 14, the cutting rollers 30 are moved back, and that part of the cyclone 4 which forms the upper, cut-off part of the inner tube 12a and the tubes 12b-12d is raised out of the water separator 2 with the aid of the handling linkage 48 (FIG. 6) and is moved to a processing station in which this part is dismantled into further, smaller pieces. The upper holding struts 10 (see FIG. 6) have been cut through with the aid of a hydraulic cutting tool in a previous step, for this purpose.

Figure 3:
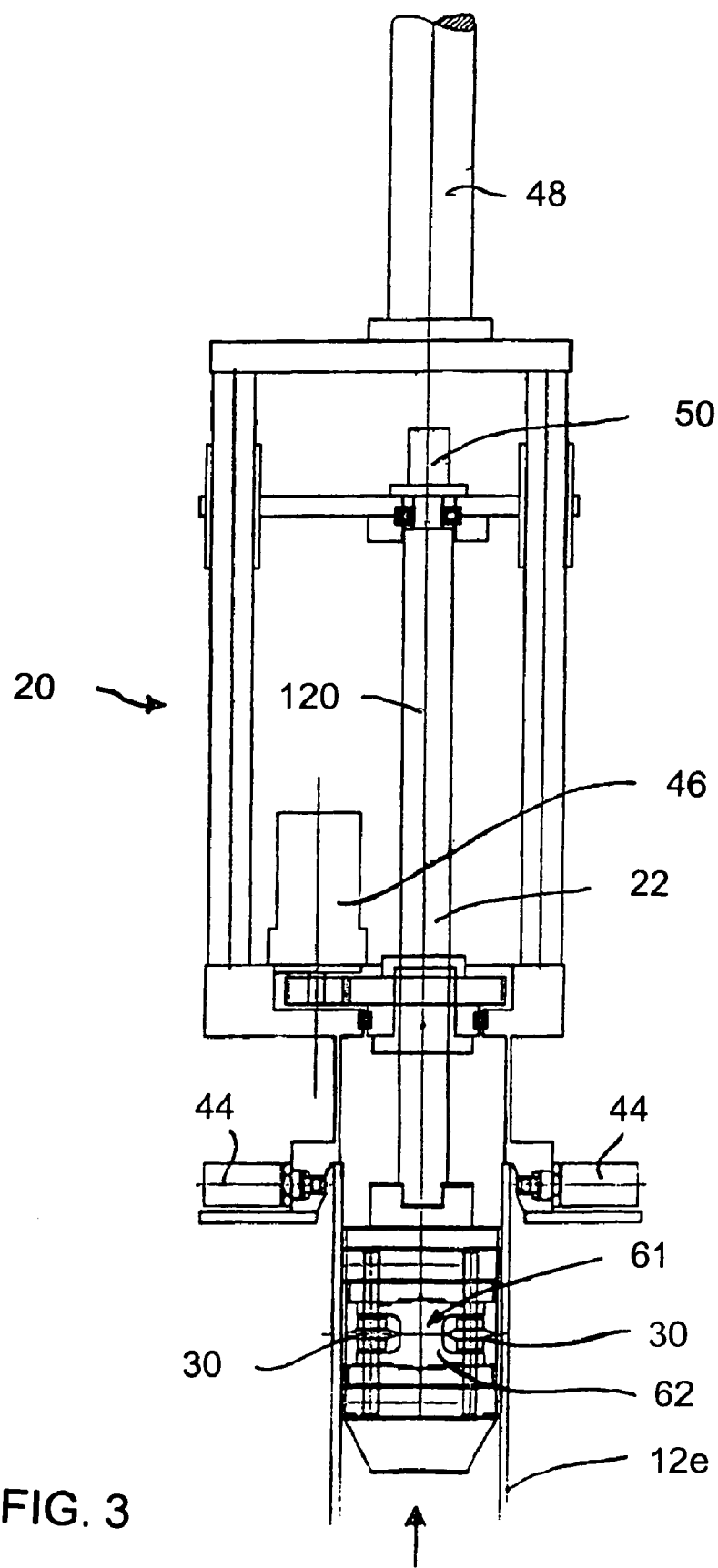
FIG. 3 is a diagrammatic, partially cutaway illustration of an alternative embodiment of the apparatus according to the invention, which is suitable for use in pieces of tubing with a larger nominal width.

As can be seen in FIG. 3, in an alternative refinement, the apparatus contains a rolling cutting apparatus 60 which can be inserted into the interior of a tube 12e. The rolling cutting apparatus 60 is disposed analogously to the exemplary embodiment shown in FIGS. 1 and 2 at the end of the shaft 22, which is mounted such that it can rotate in the base part 20 which is seated on the tube. Components which have the same function effect but are designed differently are provided with the same reference symbols in FIG. 3 as in FIGS. 1 and 2.

The rolling cutting apparatus 60 contains two cutting rollers 30, which are each mounted such that they can rotate about a rotation axis which runs parallel to the shaft 22. The cutting rollers 30 can be moved to the inner surface of the tube 12e with the aid of a hydraulic actuating apparatus and by a hydraulic cylinder 61, which acts transversely with respect to these rotation axes. The cutting rollers 30 are for this purpose mounted in two holding jaws 62, which are mounted such that they can move transversely with respect to the center axis 120. An embodiment such as this is particularly suitable for tubes 12e whose nominal width is sufficient to allow such a lateral movement to be carried out directly by a hydraulic cylinder 61 without any separate transmission being required for this purpose in order to change the direction between the positioning movement and the movement of the piston of the hydraulic cylinder.

Figure 4:
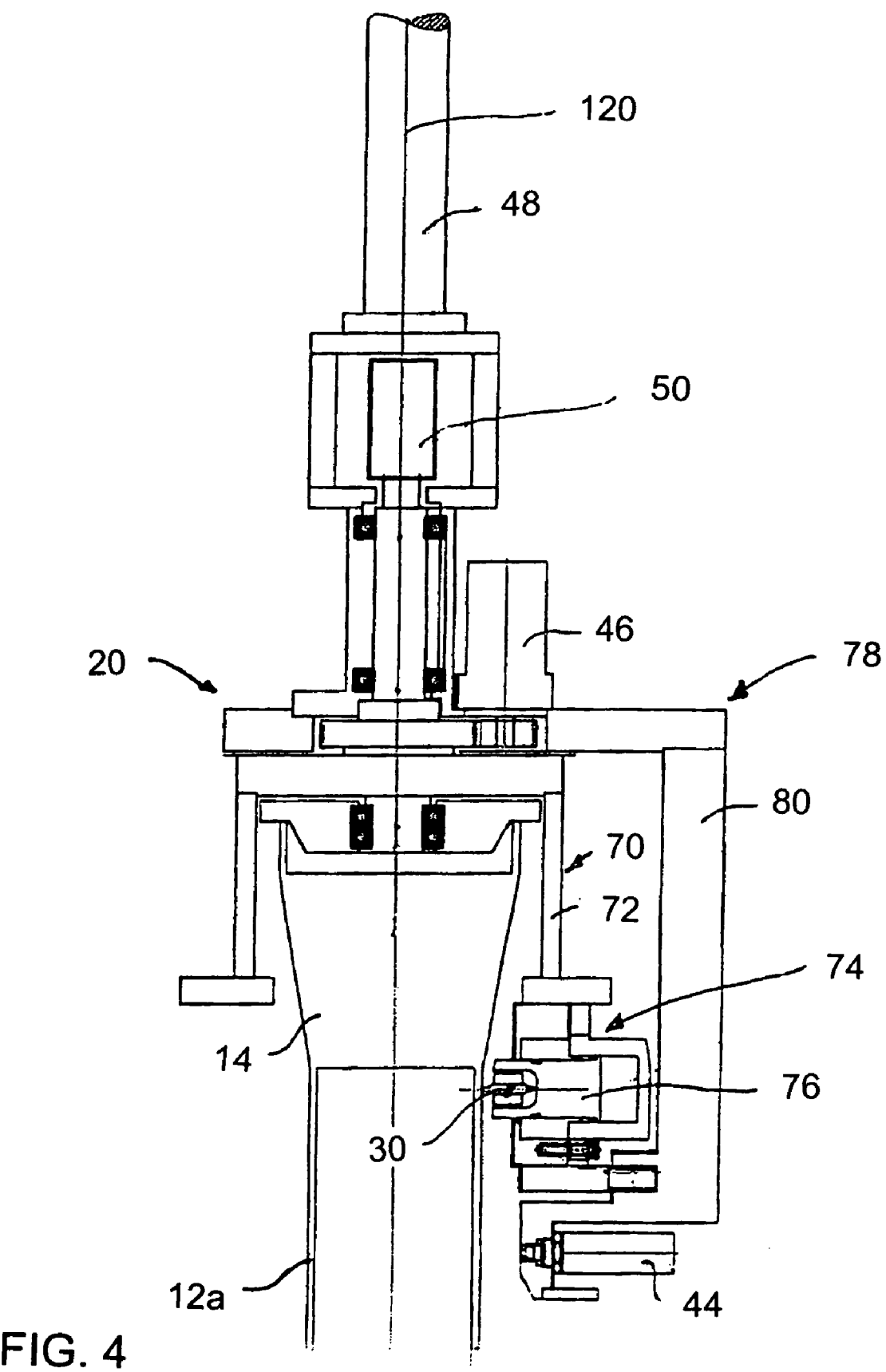
FIG. 4 is a diagrammatic, illustration of a further alternative embodiment of the apparatus according to the invention, which is suitable for use in tubular installation parts for which more space is available in the outer area.

In the alternative refinement of the apparatus according to the invention as shown in FIG. 4, a mounting rack 70 with three arms 72 is mounted on the base part 20, only one of which arms 72 is illustrated in FIG. 4, for clarity reasons. The mounting rack 70 surrounds the tube, which, in the exemplary embodiment, is the lower part of the inner tube 12a of the cyclone 4, which remains after the cutting-off process as shown in FIGS. 1 and 2. The mounting rack 70 is mounted with the aid of the rotating drive 46 in the base part 20 such that it can rotate about a rotation axis which, after correct centering of the base part 20 on the inner tube 12a, coincides with the center axis 120. Each of the three arms 72 which are mounted on the base part 20 separated by an angle of 120° is fitted with a rolling cutting apparatus 74, whose cutting roller 30 can be moved radially against the outer circumference of the lower part with the aid of a hydraulic actuating apparatus which contains a hydraulic cylinder 76.

The base part 20 also has a holding frame 78 with three holding arms 80, which each clasp the mounting rack 70 and are fitted underneath the mounting rack 70 with the radially acting clamping cylinder 44, by which the base part 20 is fixed to the tube 12a, so that the apparatus is supported by the installation part in the same way as in the exemplary embodiments explained above—in the example the lower part of the inner tube 12a.

Dismantling of a tubular installation part with the aid of a rolling cutting apparatus such as this which engages on the outer circumference is expedient when, on the one hand, sufficient space is available outside the installation part, in that, by way of example, the tubular installation part is processed only in the removed state in a processing station which is provided specifically for this purpose, and when, furthermore, because of fittings within the tubular installation part, with the swirl body of the cyclone being located in the conical tube section 14 in the illustrated example, access into the interior of the tubular installation part is made more difficult or is impossible.

Figure 5:
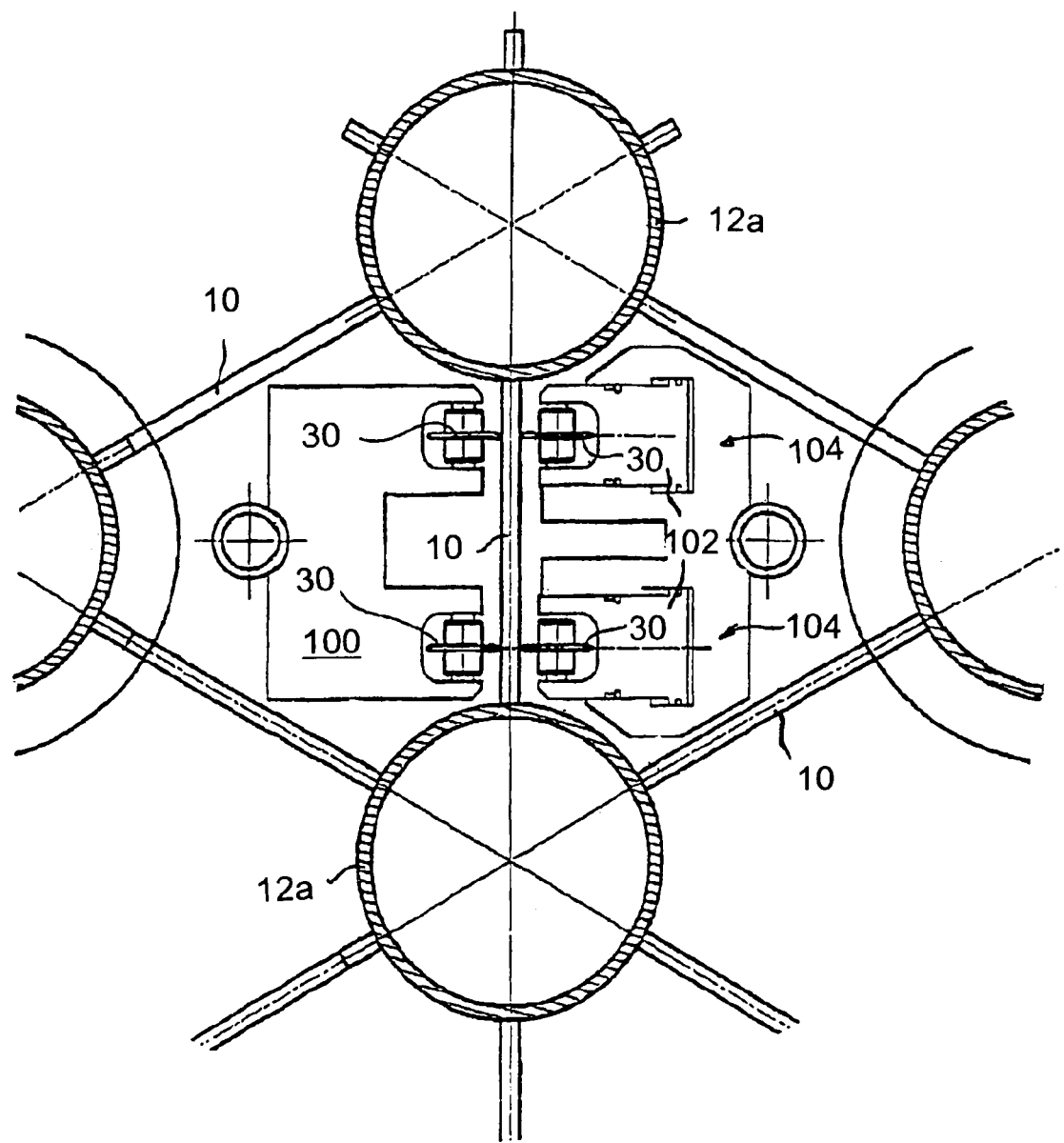
FIG. 5 is a diagrammatic, partial plan view of a water separator whose cyclones have already been partially dismantled, with the apparatus in the working position, which is used for separation of holding struts, by which the cyclones are welded.

Once the inner tube 12a has been successively dismantled, the remaining lower parts in FIG. 5, which are welded to the holding struts 10, are cut off from the rest of the assembly with the aid of a rolling cutting apparatus 100. For this purpose, the rolling cutting apparatus 100 contains four cutting rollers 30, which are opposite one another in pairs. In each case one of the cutting rollers 30, which are opposite one another in pairs, is mounted on the piston of a hydraulic cylinder 102 and can be moved against the holding strut 10 which runs between adjacent inner tubes 12a. The holding strut 10 is cut through by a vertical oscillating movement, at right angles to the plane of the drawing, with the cutting rollers 30 being pressed against it at the same time, so that the lower parts of the inner tube 12a can be removed from the rest of the assembly. The upper holding struts (process step before the cutting off of the upper part of the cyclone 4 as illustrated in FIGS. 1 and 2) can also be cut off in the same way.

This application claims the priority, under 35 U.S.C. § 119, of German patent application No. 10 2004 059 586.0-54, filed Dec. 9, 2004; the entire disclosure of the prior application is herewith incorporated by reference.

We claim:

1. An apparatus for dismantling a radioactively contaminated tubular installation part disposed under water, of a cyclone mounted in a water separator of a boiling water reactor, the apparatus comprising:
   a base part having a plurality of clamping cylinders configured for acting radially against an external circumference of the installation part for fixing said base part to the installation part; and
   a rolling cutting apparatus mounted in said base part, said rolling cutting apparatus being positioned in or on the installation part and having at least one cutting roller being moved to an inner or outer surface of the installation part and being moved along the installation part.

2. The apparatus according to claim 1, wherein said at least one cutting roller moves in a circumferential direction.

3. The apparatus according to claim 2, further comprising a rotating drive mounted in said base part, said rotating drive driving said rolling cutting apparatus.

4. The apparatus according to claim 1, further comprising a hydraulic actuating apparatus coupled to and moving said at least one cutting roller into position.

5. The apparatus according to claim 1, wherein said at least one cutting roller is mounted in said rolling cutting apparatus such that said at least one cutting roller can pivot.

6. The apparatus according to claim 5, wherein said rolling cutting apparatus is inserted into the installation part and has:
   a lever arm having a free end mounting said at least one cutting roller; and
   a hydraulic cylinder acting in a direction of a center axis of the installation part and acting on said lever arm being pivoted around an axis running at right angles to the center axis.

* * * * *